United States Patent [19]

Young et al.

[11] Patent Number: 4,827,984
[45] Date of Patent: May 9, 1989

[54] METHOD OF REPAIRING OR REPLACING PIPING AND INFLATABLE PLUG

[75] Inventors: James R. F. Young, Surrey; Brian W. York, Kent; Kenneth S. Hemingway, Darlington, all of England

[73] Assignee: Mobil Oil Corporation, New York, N.Y.

[21] Appl. No.: 188,523

[22] Filed: Apr. 29, 1988

[30] Foreign Application Priority Data

May 20, 1987 [GB] United Kingdom ............... 8711913

[51] Int. Cl.⁴ ..................... F16L 55/10; F16L 55/18
[52] U.S. Cl. ........................................ 138/93; 73/49.8;
    137/223; 137/231; 137/315; 138/97
[58] Field of Search ............... 137/15, 223, 231, 315,
    137/317, 318, 319; 73/40.5 R, 49.6, 49.8;
    138/93, 97

[56] References Cited

U.S. PATENT DOCUMENTS

| | | | |
|---|---|---|---|
| 2,130,030 | 9/1938 | Richardson | 138/93 |
| 2,309,429 | 1/1943 | Ahern | 138/93 |
| 2,843,154 | 7/1958 | Hosking | 138/93 |
| 3,473,555 | 10/1969 | Martin et al. | 137/315 |
| 3,665,966 | 5/1972 | Ver Nooy | 138/93 |
| 4,184,504 | 1/1980 | Carmichael et al. | 137/315 |
| 4,342,336 | 8/1982 | Satterthwaite et al. | 138/93 |
| 4,442,867 | 4/1984 | de Sivry et al. | 138/93 |
| 4,671,518 | 6/1987 | Retz | 138/93 |

FOREIGN PATENT DOCUMENTS 2064703  6/1981  United Kingdom ............... 137/315

Primary Examiner—George L. Walton
Attorney, Agent, or Firm—Alexander J. McKillop; Charles J. Speciale

[57] ABSTRACT

A method of repairing piping by inserting an inflatable plug 30 through a pressure housing 28 and valve 24, inflating the plug and then inserting a screwed sealed plug 47 into a special flange 49 which is attached to an existing pipe flange. The plug 30 has a sealing ring 36 with a tread 37 and segmented steel rings 38. After the plug is inserted the piping may be repaired or replaced and the inflatable plug deflated and removed with the screwed plug 47 by a system of rods extending through the valve and pressure housing.

3 Claims, 8 Drawing Sheets

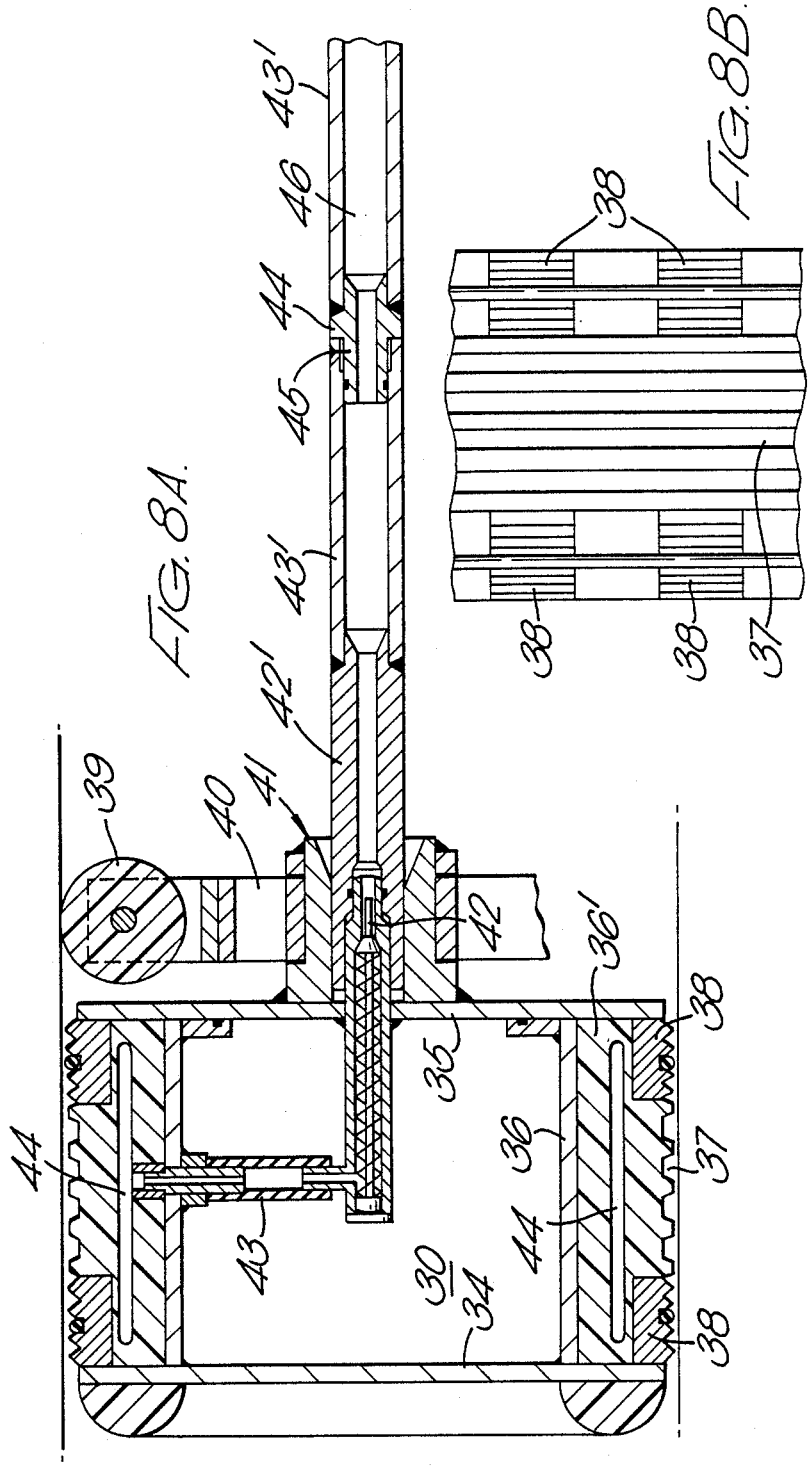

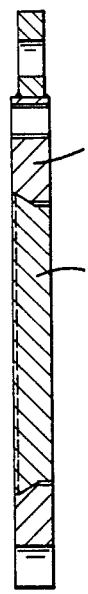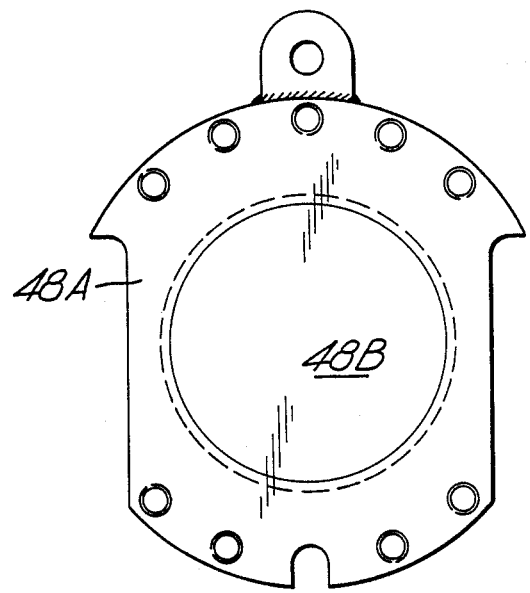
FIG. 9A.  FIG. 9B.
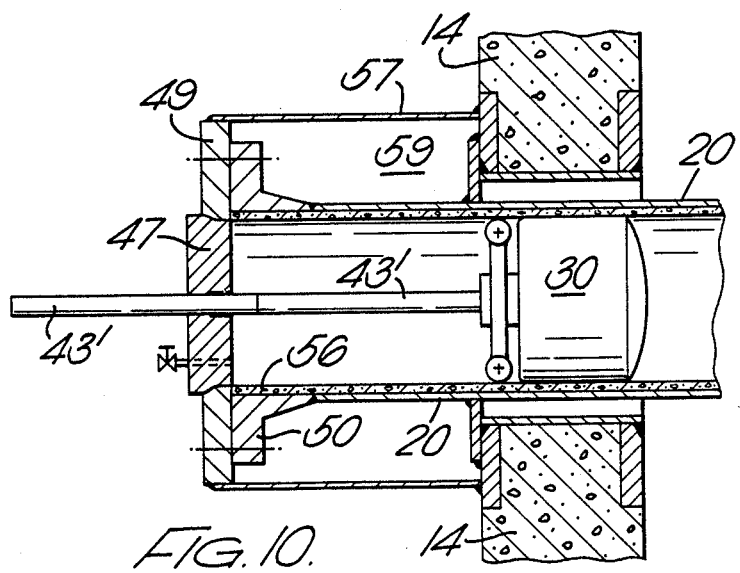
FIG. 10.

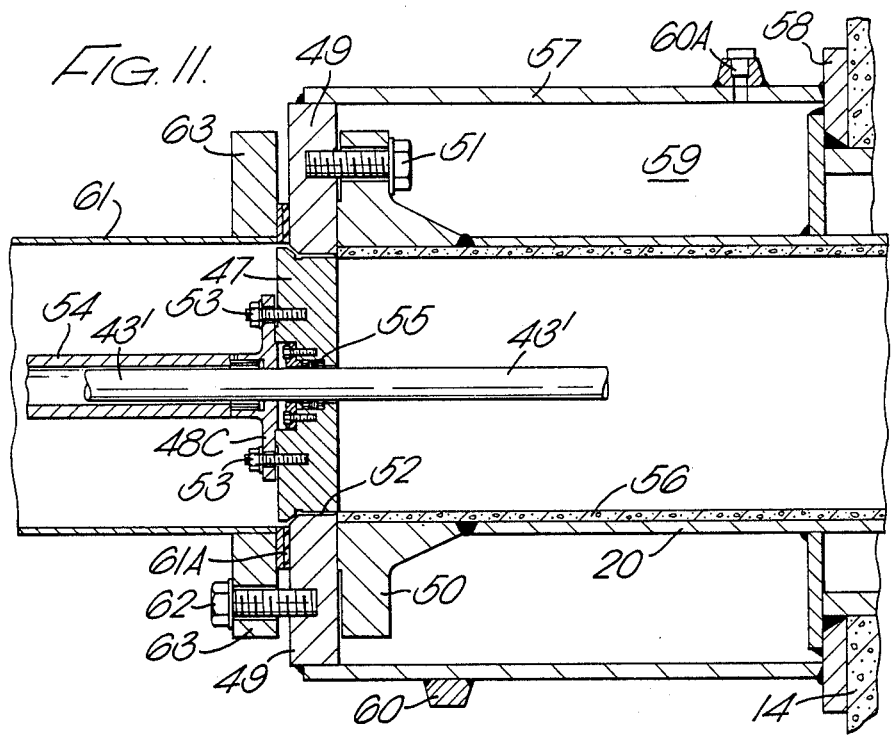
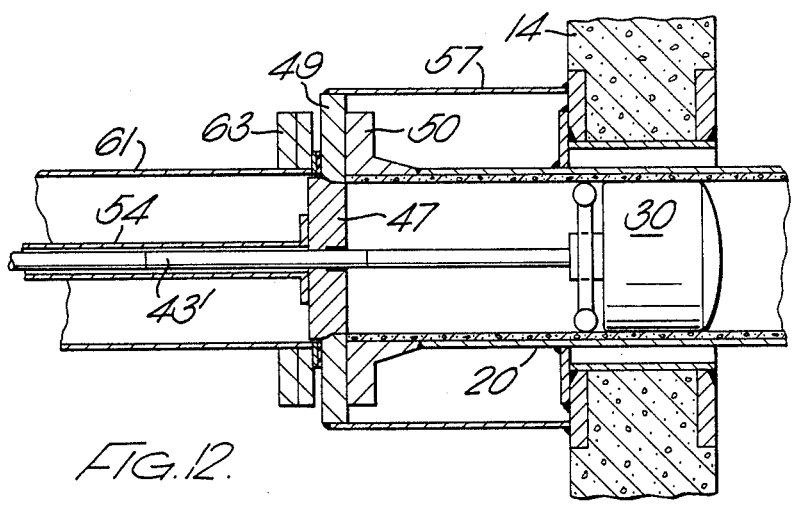

METHOD OF REPAIRING OR REPLACING PIPING AND INFLATABLE PLUG

This invention relates to a method of repairing or rereplacing pipes, joints, etc., in a piping system and to an inflatable plug and other apparatus for carrying out the method.

In situations where it is not possible to completely drain down a piping system, and it is necessary from time to time to repair or replace parts of the systems such as pipes, joints, etc., it is necessary to find some ways of plugging the piping so as to prevent leakage of fluid which remains under pressure during the replacment operation.

While the invention has general application to any piping system, it has particular relevance to pipes which are of unusual construction or which are in unusual locations and which work under arduous conditions.

For example, in an off shore oil production platform where there are, at the base of the platform, oil storage tanks, the tanks have to be ballasted using sea water from time to time to compensate for filling and removal of oil from the storage tanks.

The piping used to convey the sea water from a sea water storage tank to the oil storage tanks is often lined, for instance, with cement, and it is difficult to produce a plug which will seal against a potentially rough or damaged cement surface without causing further damage to the lining. It is also difficult to seal against the surface of this type when it is covered with an oily layer.

One object of the present invention is to provide a reliable plugging system which has the capability of sealing against a potentially rough or damaged cement surface, or against an oil surface.

A further object of the present invention is to provide a method of replacing pipes and pipe joints in a pipe system under pressure using a plugging system, the method being particularly adapted, but not exclusively useful, for pipe systems of the type used in oil platforms.

In U.S. Pat. No. 3,665,966 is disclosed an inflatable plug for plugging a pipe in which the sealing member is made of rubber and has a rubber band on its exterior surface which engages the interior pipe wall. The plug can be inflated by air pressure from a position externally of the pipe by use of a hollow central rod which extends through the pipe wall.

In GB-A-2064703 is disclosed a flexible, inflatable pipe plug made of plastic material with external hoops, also of plastic material which engage the pipe wall. Inflation is achieved via an axial pipe which extends through the pipe which is to be plugged into the flexible, inflatable plug.

In accordance with one aspect of the invention there is a plug for plugging a pipe which comprises an inflatable outer layer or tire with means on the outer layer adapted to provide a pressure seal and to grip the inner surface of a pipe.

The means to provide a pressure seal against the inner surface of the pipe may, for example, be in the form of a tread-like pattern e.g. a waffle-like pattern and there may also be metal bands or segments incorporated in the outer surface of the inflatable plug, preferably adjacent the edges of the plug, so as to assist in gripping and holding the plug centrally in place.

The plug is preferably inflatable by remote means, so that it may be placed in a pipe and then inflated and deflated from a remote point. This may be achieved by use of a series of segmented rods attached to the inflatable plug and providing an axial passage for water or other medium to flow to inflate and deflate the plug. Preferably the plug has a plunger type check valve so that internal plug pressure is maintained during inflation, and so that it may be operated remotely by inserting an operating rod in the above mentioned segmented rods and pressing the valve to deflate the inflated plug.

The plug seal surface and inflatable element is preferably made of polyurethane or other plastics material and the metal segments or strips adjacent the edges of the plug are preferably of steel and are adapted to provide both centralisation and grip.

Preferably the plug comprises two metal end plates supporting a metal drum on which is mounted the inflatable plastics tire. Preferably the inflation of the plug is via an axial entry on one of the end plates and a flexible pipe connecting the valve at the entry to the inflatable tire.

A feature of the invention is the provision of a screwed plug adapted to be attached via a special flange to a portion of pipe after the inflatable plug has been put in it, the screwed plug having a sealed central aperture through which the inflation tube may be passed and also through which a deflation rod may be passed through the centre of the inflation rods.

The flange with the screwed plug acts as a pressure containing back-up in case of inflatable plug failure.

Apparatus for inserting the inflatable plug into the pipe may include a pressure housing adapted to receive the plug, the pressure housing being provided with a means to supply fluid pressure to the interior of the housing so as to equalise the pressure within the housing and the pressure in the piping. The pressure housing may be used in conjunction with a ball or other valve, the valve being of sufficiently large internal diameter to allow the plug to be passed through it, so as to enter the piping.

From another aspect the invention comprises a method of repairing or replacing piping or joints or other apparatus in a piping system, the method comprising closing a ball or other valve in the piping, draining down the piping upstream of the ball valve leaving the downstream part under pressure, removing the piping upstream of the ball valve, attaching a pressure housing to the ball valve, inserting a plug in the pressure housing, putting fluid into the pressure housing to bring it up to the pressure downstream of the valve, opening the valve, putting the plug through the valve into a portion of piping downstream, inflating the plug, and testing to see whether the plug is pressure-tight, and then removing the valve and housing so as to expose the piping which is to be repaired or replaced.

From another aspect the invention comprises a method of re-inforcing a stub-pipe, that is to say a pipe which projects through a partition or wall and in which only the parts of the pipe on the one side of the wall, called the stub-pipe, can be reached, the method comprises attaching a flange to the end of the stub-pipe, welding an encasement pipe or can to the flange and to structure adajcent the wall or partition, filling the space between the addition pipe and the original pipe with a grout filler material, such as concrete, and thus sealing the original stub-pipe within the encasement pipe or can.

This method may be used separately or in conjunction with the method and apparatus described above.

From yet another aspect the invention comprises a method of repairing or replacing a pipe comprising attaching to the pipe a ball or other type of valve, attaching to the ball or other valve a pressure housing containing an inflatable plug, equalising the pressure within the housing to that existing beyond the ball valve, opening the ball valve and passing the plug through the ball valve and through a length of the pipe into the part of the pipe beyond the first joint in the pipe, pressurising the pressure valve by passing water or other medium through hollow segmented rods attached to the inflatable plug, and when the pipe is sealed by the inflatable plug removing the pressure housing, ball or other valve, and the first length of the pipe up to a point just before the position of the plug, attaching a new flange to the exposed length of pipe adjacent the plug, inserting in a central hole in the new flange a screwed and sealed plug, to provide additional security in case the inflatable plug leaks or fails, attaching to the screwed plug a withdrawal rod, building a new spool or pipe length onto the new flange, and when the pipe has been rebuilt and or the repairs completed, replacing the ball valve onto the new pipe, adding a pressure housing, and then withdrawing the screwed plug by means of the screwed plug withdrawal rods and deflating and withdrawing the inflatable plug.

In the accompanying drawings:

FIG. 8A is an enlarged section of an inflatable sealing plug, and segmented hollow rods via which inflation and deflation of the plug can be effected;

FIG. 8B is a developed view of a portion of the surface of the plug;

FIGS. 9A and 9B illustrate a special blind plate;

FIG. 10 shows a portion of pipe passing through the mini-cell wall with an inflatable plug positioned in it and a screwed plug positioned in a new, added flange;

FIG. 11 is an enlarged section of a portion of pipe shown in FIG. 10; and

FIGS. 12 to 16 illustrate steps in the removal of the screwed plug and inflatable plug after renewal of section of pipe and other operations have been completed.

Figure 1:
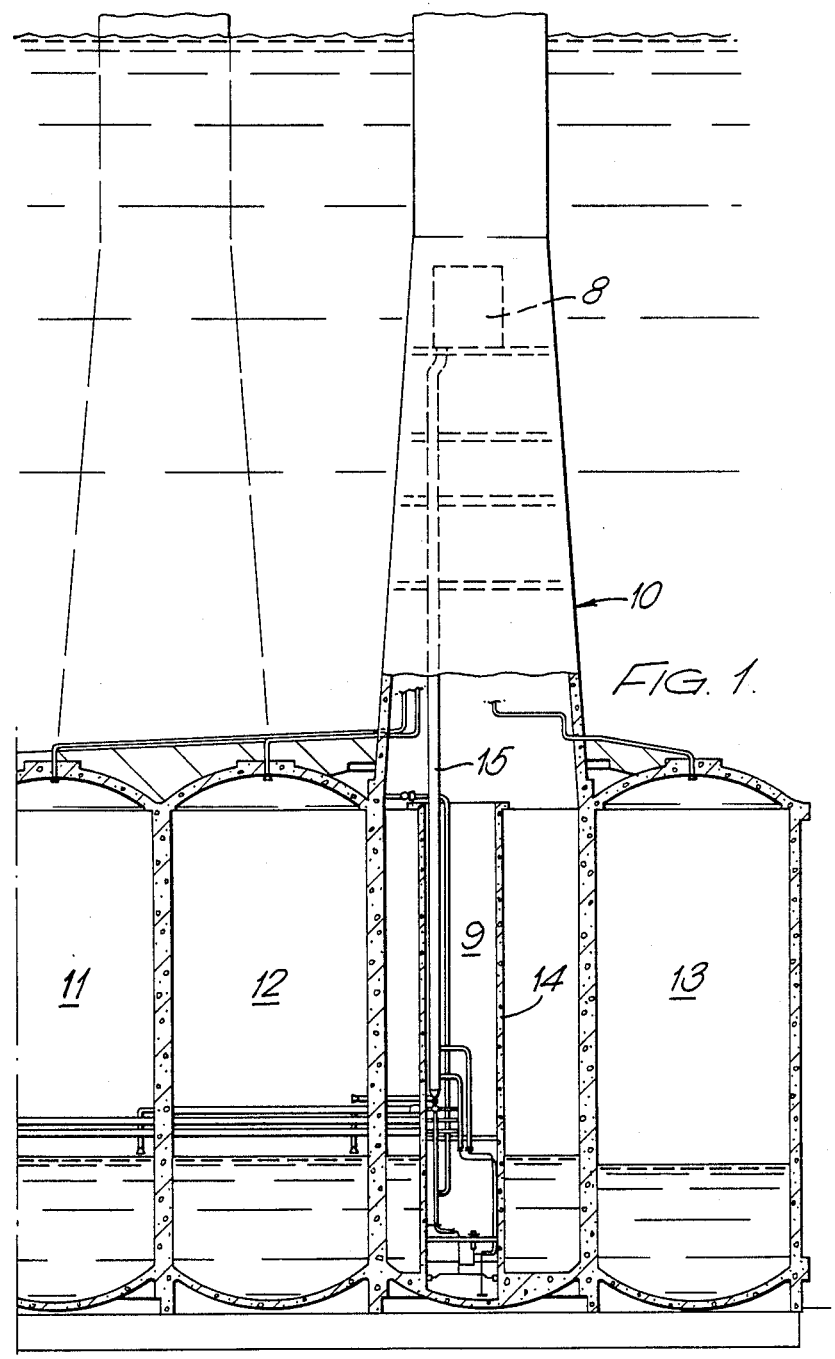
FIG. 1 is a section through part of a leg of a known oil production platform and shows storage tanks normally located well below the surface of the sea.

In FIG. 1 is shown the lower portion of one leg of an oil platform 10 which has storage tanks 11, 12 and 13 adapted to store oil and also to receive sea water for ballasting.

Figure 2:
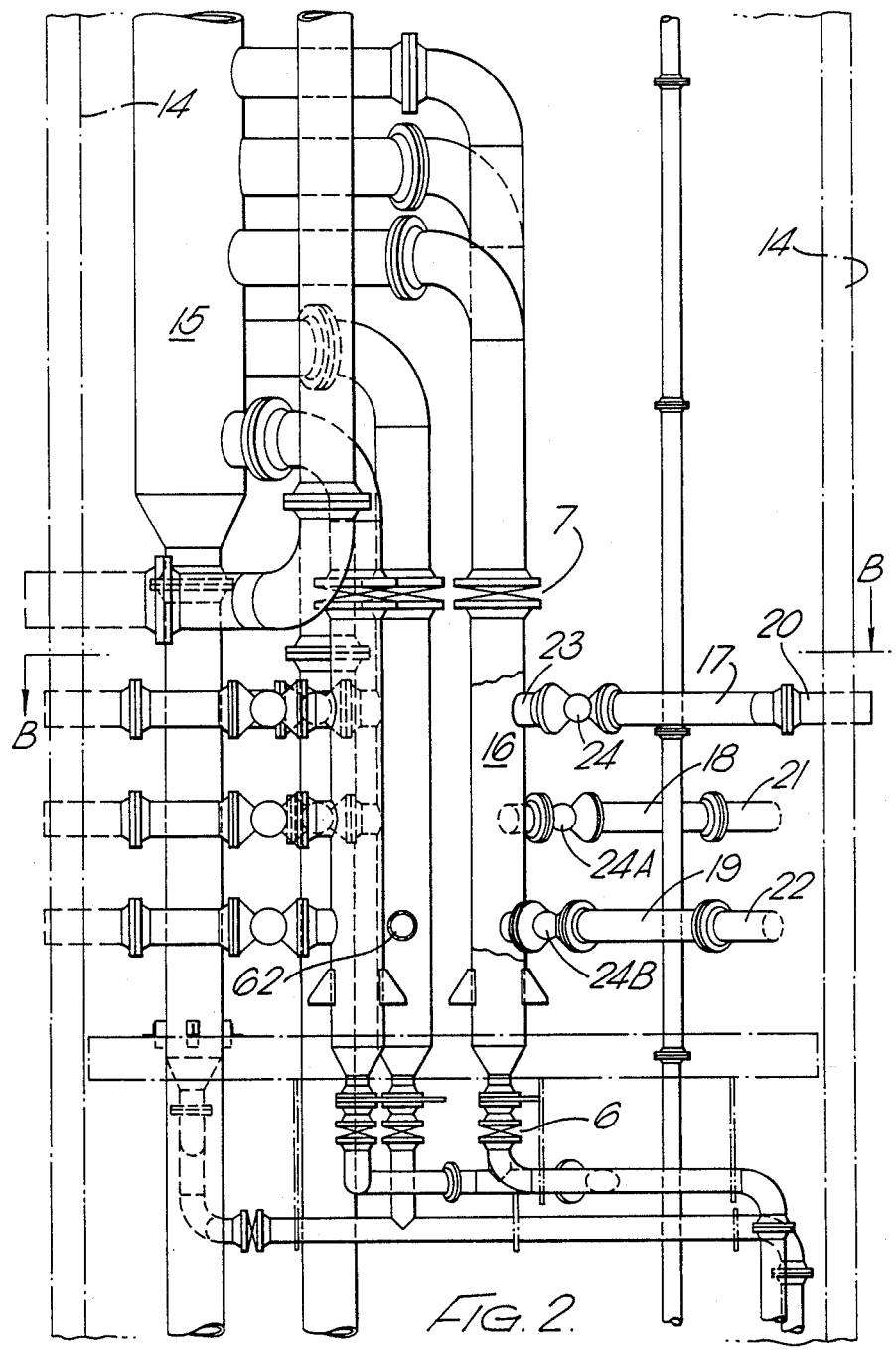
FIG. 2 shows part of the sea water ballasting piping system contained in a "mini-cell" within the leg of the oil platform shown in FIG. 1.
Figure 3:
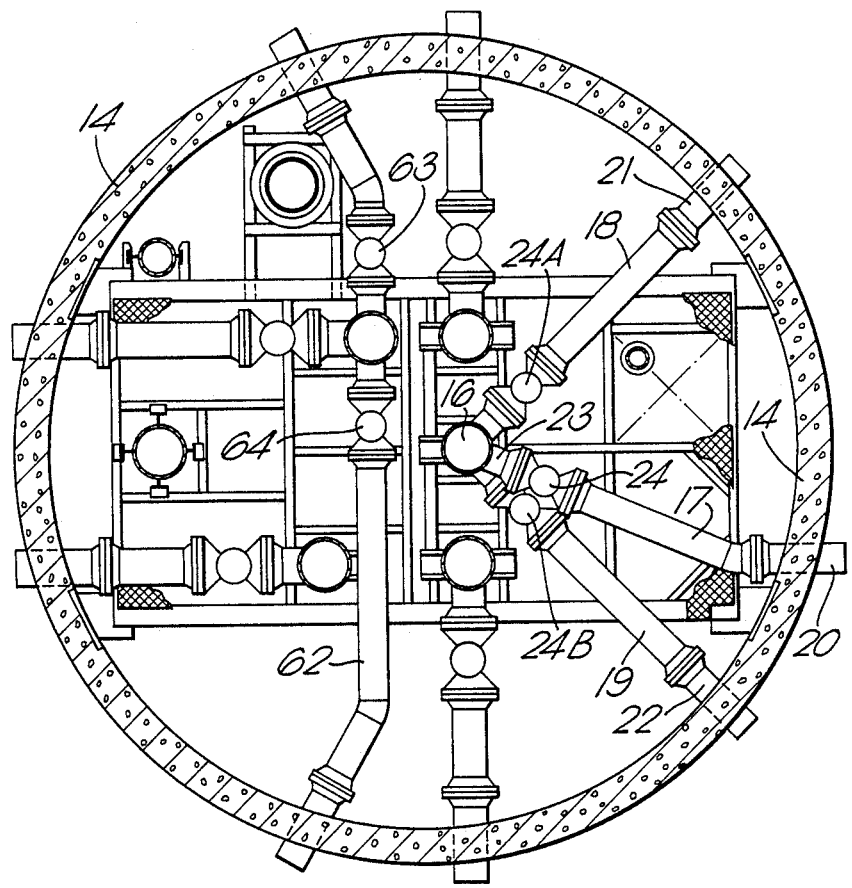
FIG. 3 is a section on line B—B of FIG. 2.

Within the leg 10 is a mini-cell 9 having mini-cell walls 14 and containing piping. A portion of the mini-cell is shown in FIGS. 2 and 3 and it will be seen that within the mini-cell wall 14 is a main or header pipe 15, supplied by a sea water tank 8, and splitting to a sub-header pipe 16 (see FIGS. 2 and 3) which in turn feeds a series of spools 17, 18, 19 etc. A spool is a length of pipe with flanges at each end, the pipe being a cement lined steel pipe.

Taking as a particular example the spool 17 shown in FIG. 3 it will be seen that it is fed from a header pipe 16 via a short length of pipe 23 through a ball valve 24 and thence into the spool which consists of a length of pipe 25 and two joints 26 and 27.

Figure 4:
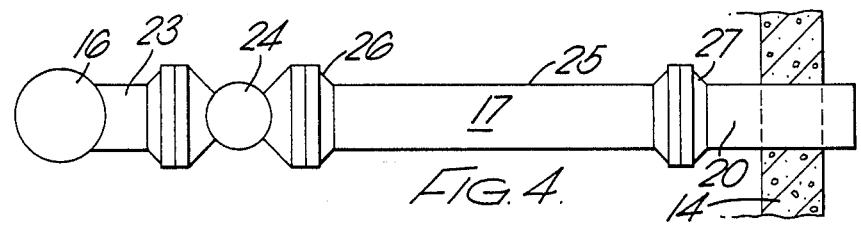
FIG. 4 is an enlarged plan of a portion of piping shown in FIG. 3 and illustrates a section of pipe, with flanges, which is to be replaced.

FIG. 4 shows this assembly of mini-cell, valve and pipes.

In the present instance it is assumed that it is necessary to replace the spool 17 and also to make the stub-pipe 20, which cannot be replaced, safe and fluid tight even if the pipe 20 itself is corroded and may fail.

In order to do this it is necessary to plug the stubpipe 20, to remove the spool 25, and, with the pipe 20 plugged, to work on rendering the stub-pipe 20 fluid tight and safe and replacing the spool 17.

The operations involved in carrying out this programme will now be detailed.

Referring again to FIGS. 2, 3 and 4, it is necessary to drain down the sub-header pipe section 16 and the pipe 23 whilst the valve 24 is closed. This is achieved by closing valves 6 and 7 at the bottom and top of the pipe 16, closing valve 24 and valves 24A and 24B and draining and removing the sub-header pipe section 16.

Figure 5:
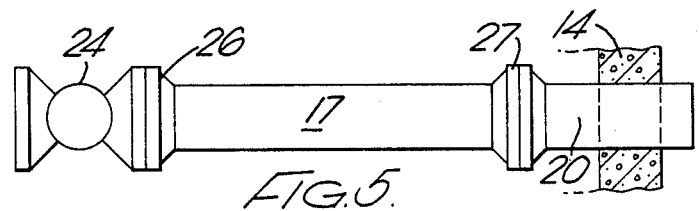

Once this is done the sub-header pipe and pipe 23 may be removed thus leaving the valve 24 exposed as indicated in FIG. 5, and providing room to work on the spool 17.

Figure 6:
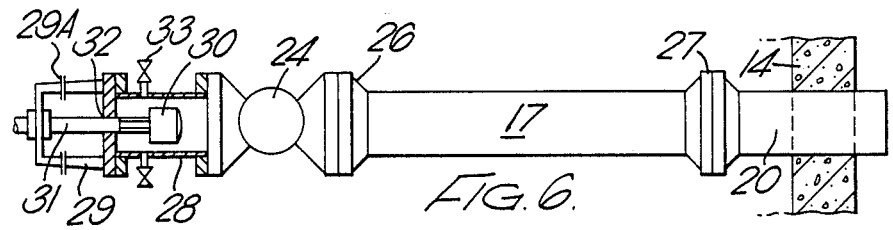
FIGS. 5, 6 and 7 illustrate steps in insertion of a sealing plug in the pipe to enable sections of the pipe to be replaced.

A special form of pressure housing 28 may now be bolted to the flanges of valve 24, which may be a ball valve, as seen in FIG. 6.

Attached to the pressure housing 28 is a plug control housing 29, incorporating jacking mechanism 29A to move a plug 30 along the pipe - both to push it in and to pull it out of the spool. Housing 28 contains the special plug 30 made in accordance with the present invention. The plug 30 has attached to it one section of a rod 31 which passes through a sealed apperture 32 in the plug housing 29. The pressure housing 28 has a valve controlled inlet 33 so that the housing may be pressurised to equal the pressure downstream of the valve 24.

When the housing has been pressurised the valve 24 may be opened and the plug 30 pushed through the pressure housing 28 and the open valve 24, through the mini-cell 17 and into the section of the pipe 20.

Figure 7:
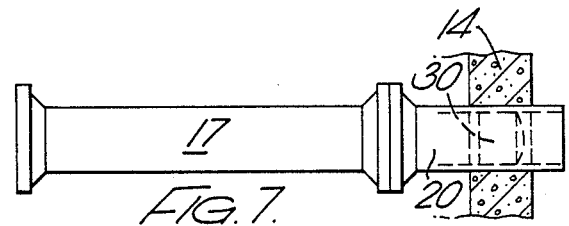
Figure 13:
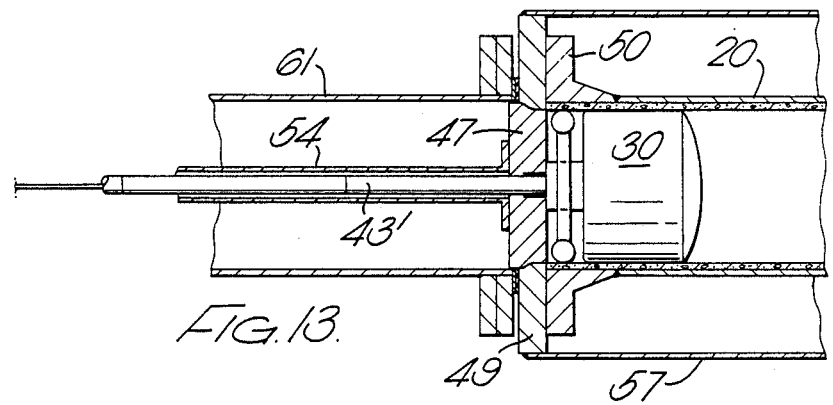

The plug 30 may then be inflated so that its exterior tire or inflatable portion will seal against the inner concrete lined surface of pipe 20. Once checks have been made to ensure that the plug is pressure tight, the housings 28 and 29 and valve 24 may be removed and then the spool 17 may be removed, as seen in FIG. 7.

The inflatable plug 30 is shown in detail in FIGS. 8A and 8B. The plug has a steel frame consisting of two end plates 34, 35 joined by a plastics drum 36 which carries an inflatable plastics material tire or sealing ring 36'. The sealing ring has a patterned polyurethane surface 37 or tread and segmented steel vice rings 38 around its exterior surface, as shown.

The plug 30 is guided by three polyurethane wheels 39 supported on arms 40, of which only one is shown in FIG. 8A.

For inflation of the inflatable tire 36 a valve housing 41 is provided containing a plunger type valve 42, which, via a flexible pipe 43 feeds into an annular space 44 within the plastics material tire 36. A tube 42' has attached to it the first of a series of segmented rods 43' which are connected by joints 44 held in place by set screws 45. Through the segmented rods is a central passage 46 which can be used for inflation and which also makes provision for a rod to be inserted within the passage so as to contact the plunger valve 42 to release the pressure in the tire.

Other special apparatus used in carrying out the present invention, includes a screwed plug 47 which is shown in FIG. 11 and a special plate known as a blind plate 48A shown in FIGS. 9A and 9B.

Referring now to FIGS. 10 and 11, having got the inflatable plug 30 in position in the pipe 20 and inflated it, in line with the mini-cell wall 14, a special blind plate 48A is temporarily attached to the flange 50 of pipe 20 by bolts 51. Screwed in plate 48A is a plug 48B.

The blind plate 48A provides security against inflatable plug failure. If the plug should fail a temporary valve may be bolted to flange 50, a pressure housing added, and the failed plug retrieved through the pressure housing after which the normal sequence may be resumed.

The special 'blind' plate 48A (FIGS. 9A and 9B) can be attached to stub-pipe flange 50 first, since this can be fitted purely for security without losing bolt contact between stub 20 and old spool 17.

At a later stage, when the plug has been removed, the blind plate 48A including its screwed plug 48B, is removed again without losing bolt contact. A new flange 49 with screwed plug 47 may then be added as shown in FIG. 11.

To render tube 20 (FIG. 11) with its concrete lining 56 safe (tube 20 being part of an existing spool, which passes through the mini-cell wall), an encasement can 57 is welded to the new flange 49 and to existing water-line sleeves 58 so as to surround stub-pipe 20.

The annular space 59 may then be filled with concrete or other grouting material via grout fill hole 60, a grout vent 60A being provided to release the entrapped air.

A new titanium or other corrosion resistant material spool 61 is now offered up to the new flange 49 with a suitable gasket 61A between the spool and the flange. Before it is then retained in position by bolts 62 passing through holes in an annular retainer plate 63, the bolts entering threaded bores in the flange 49, inflation tubes 43' are connected so that the tube extends beyond the other end of the spool.

The flange plate 48C (FIG. 11) is now attached to the screwed plug 47 by means of bolts 53 and screwed plug withdrawal rod 54 is then attached to the plate 48C so that the screwed plug can eventually be withdrawn.

The inflation tube, made up of segmented rods 43' will pass through this series of withdrawal rods 54 and will be sealed, as it passes through the screwed plug 47 by packing glands 55.

FIGS. 12 to 16 illustrate the steps in the removal of the inflatable plug 30 and screwed plug 47.

The screwed plug withdrawal rods 54 and inflation tube 43' having been connected up prior to bolting up the new spool 61 it is possible to loosen the screwed plug before completing the bolting up of the spool.

Figure 14:
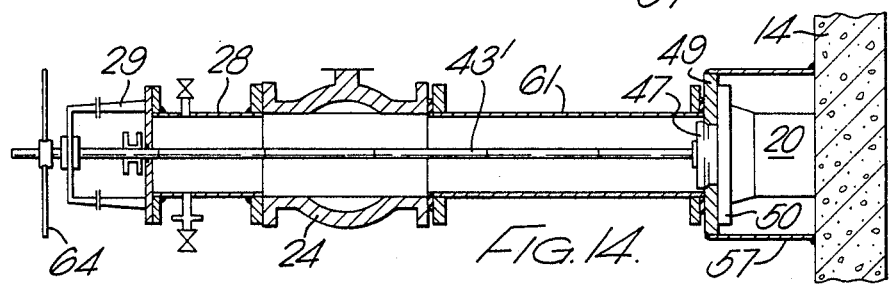

As shown in FIG. 14 the cell isolation ball valve 24 is now attached to the new spool 61 and it will be seen that the plug removal pressure housing 28 can now be fitted with the screwed plug removal rods, with the inflation tube inside it extending throughout the length of the ball valve and pressure housing so as to extend through sealed glands to the exterior of the housing 28 where a jacking mechanism 64 is attached.

Figure 15:
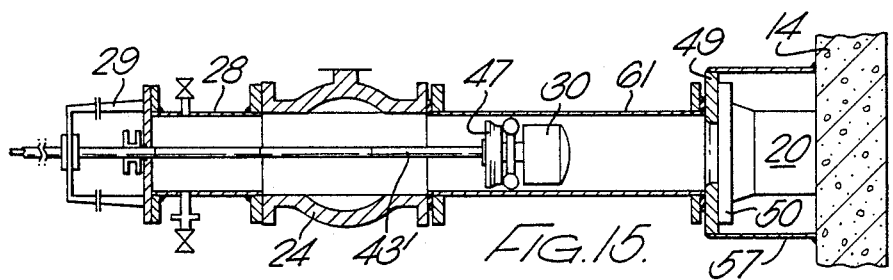

After filling 24, 28, 61 with water and pressurising to equalise pressure both sides of screwed plug, the screwed plug may then be unscrewed and, as shown in FIG. 15, removed pulling the plug removal tube outwardly and disconnecting in sections as they are withdrawn.

A deflation rod may now be passed down the inflation tube to depress the valve and the inflatable plug thus releasing the sealing pressure. Deflated plug and rods removed in similar manner to screwed plug.

Figure 16:
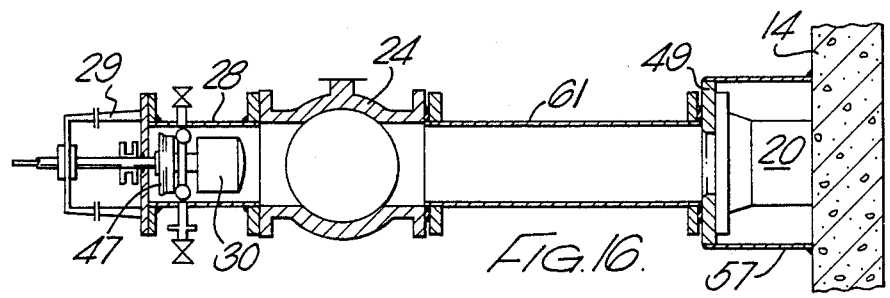

Once the plugs have been pulled back into pressure housing the cell isolation valve may be closed as shown in FIG. 16. The pressure housing can then be drained and removed and at this stage the original piping or new piping and flanges, etc., may be attached to the cell isolation valve to reconnect into the system.

It will be seen that the invention provides the capability of inserting the sealing plug through an existing cell isolation ball valve and positioning the plug accurately at a point several metres from the insertion point. It provides for the capability to seal against potentially rough or damaged cement surface without causing further damage to the lining and to seal against a surface such as the above covered with an oily layer. The system provides for reliable remotely controlled activation and deactivation of a plug and reliable retrieval.

The use of the screwed plug flange 49 ensures that the joint between its flange and the existing nozzle is not worked on further after the plug has been fitted. The 'special blind' flange is also fitted with a screwed plug such that in the even that it acts as a pressure containing flange the valve and pressure housing may be fitted to enable retrieval of a failed plug and recommencement of the construction sequence. The storage cell in question would not then be lost.

The materials used for replacement may be carbon steel or stainless steel or titanium or any other suitable form of corrosion resistant piping and joints.

The apparatus and method described enable work to be carried out with a sea water head of as much as 10 bars above is capable of maintaining a seal at these high pressures.

The apparatus may also be used where the available space is very limited, e.g. where a spool such as spool 62 in FIG. 3 is to be replaced and the initial working space is limited by the close proximity of valves 63 and 64.

We claim:

1. A plug for plugging a pipe comprising:
   (a) a drum,
   (b) an end plate mounted on each end of said drum to form an inner cavity within said drum, each end plate having a portion extending beyond the sides of said drum,
   (c) an inflatable tire mounted about said drum between the extended portions of said end plates, said tire having recessed portions along its outer surface along the edges of said tire adjacent the extended portions of said end plates,
   (d) rings positioned about said tire in said recessed portions to provide both centralization of said tire between said end plates and grip of said tire about said drum, and
   (e) means for providing inflation pessure to said tire such that when placed within a pipe the outer portion of said tire between said rings inflates to provide a pressure seal against the inner surface of said pipe for plugging said pipe.

2. The plug of claim 1 wherein said means for providing inflation pressure to said tire comprises:

(a) an axial entry through one of said end plates into the inner cavity within said drum,
(b) a tube extending through said axial entry such that a first end is within said inner cavity of said drum and a second end is outside said drum,
(c) an annular space within said tire,
(d) a flexible pipe extending from the first end of said tube into said annular space, and
(e) valve means connected to the second end of said tube for supplying pressure through said tube and said flexible pipe to said annular space to inflate that portion of said tire between said rings to effect said pressure seal against the inner surface of said pipe.

3. The plug of claim 1 wherein said rings are circumferentially segmented about said tire.

* * * * *